United States Patent [19]
Iino

[11] Patent Number: 5,477,449
[45] Date of Patent: Dec. 19, 1995

[54] HIERARCHICAL MODEL PREDICTIVE CONTROL SYSTEM BASED ON ACCURATE MANIPULATION VARIABLE PREDICTION

[75] Inventor: Yutaka Iino, Kawasaki, Japan

[73] Assignee: Kabushiki Kaisha Toshiba, Kawasaki, Japan

[21] Appl. No.: 227,386

[22] Filed: Apr. 14, 1994

[30] Foreign Application Priority Data

Apr. 14, 1993 [JP] Japan .................................. 5-087584

[51] Int. Cl.$^6$ .................................................. G05B 13/04
[52] U.S. Cl. ........................... 364/149; 364/131; 364/162
[58] Field of Search ..................................... 364/148–179, 364/180, 182, 131–137

[56] References Cited

U.S. PATENT DOCUMENTS

| | | | |
|---|---|---|---|
| 5,111,531 | 5/1992 | Grayson et al. | 364/162 |
| 5,142,612 | 8/1992 | Skeirik | 364/149 |

FOREIGN PATENT DOCUMENTS

| | | |
|---|---|---|
| 4-118703 | 4/1992 | Japan . |
| 4-256102 | 9/1992 | Japan . |

OTHER PUBLICATIONS

H. Nishitani, Journal of the Society of Instrument and Control Engineers, vol. 28, No. 11, pp. 996–1004 (1989) (English language abstract).
D. W. Clarke & C. Mohtadi, Properties of Generalized Predictive Control, Automatic Control, Automatica, vol. 25, No. 6, p. 859 (1989).
Garcia, et al., Model Predictive Control: Theory and Practice–A Survey, 1989, Automatica, vol. 25, No. 3, pp. 335–348.

Primary Examiner—James P. Trammell
Attorney, Agent, or Firm—Foley & Lardner

[57] ABSTRACT

A hierarchical model predictive control system has a decentralized control system having a plurality of PID controllers each having a plurality of control modes for a PID calculation of a manipulation variable for controlling a process variable of the control object, and for controlling the control object on the basis of an obtained manipulation variable; and a model predictive controller for reading each of a control mode and control information of the PID controllers at a predetermined control cycle, for predicting a process variable future value of the control object by using a dynamic characteristic model of the control object on the basis of the control mode and control information read from the PID controllers, for sequentially calculating the manipulation variable about each of the PID controllers in the manner that a performance function with respect to a deviation and a manipulation variable between a predicted process variable future value and a process variable reference value added in advance becomes a minimum value, and for transmitting a calculated manipulation variable as a set point value corresponding to the control mode to the corresponding PID controller. The PID controller performs a PID calculation corresponding to the control mode on the basis of a set point value supplied from the model predictive controller or a set point value set by an operator.

18 Claims, 5 Drawing Sheets

HIERARCHICAL MODEL PREDICTIVE CONTROL SYSTEM BASED ON ACCURATE MANIPULATION VARIABLE PREDICTION

BACKGROUND OF THE INVENTION

The present invention relates to a hierarchical model predictive control system, and more particularly to a model predictive control system for calculating a manipulation variable on the basis of a prediction of a prospective motion corresponding to a control on the basis of dynamic characteristics model of a control object.

In recent years, a model predictive control apparatus is often used in a field of process control. The model predictive control apparatus has many characteristics as follows:

(a) it is possible to realize a stable control response against a control object having a long dead-time;

(b) it is possible to improve a following-up by a feed forward control using a prospective reference value;

(c) it is possible to apply for a multivariable control system;

(d) it is possible to easily construct a control system from, for example, a step response which does not need a dynamic characteristics model having an exact control object;

(e) it is possible to precisely control an object by including a physical law and non-linear characteristics of a plant in the predictive model; and (f) it is possible to directly enter restriction conditions such as upper and lower limits and a change rate limiter with respect to operation of the control object, into a control side.

There have already been provided a plurality of predictive control systems which are disclosed in some documents as follows:

(1) Nishitani: A practical application, measurement and control for a model predictive control, Journal of the Society of Instrument and Control Engeneers, Vol.28, No.11, pp.996–1004 (1989); and (2) D. W. Clarke & C. Mohtadi: Properties of Generalized Predictive Control, Automatica (issued by International Federation of Automatic Control), Vol.25, No.6, p.859 (1989).

Especially in the document (2), there is proposed a generalized predictive control (GPC) system including various model predictive systems. The GPC system is a system that, when a prospective reference value $y^*$ is supplied, a control response prospective value $[y(k+i); i=1, \ldots, N_D]$ is predicted on the basis of a model of a process or a control object, and a manipulation variable increased value $\Delta U(k)$ for causing a performance function J showing a control request to be the minimum value is obtained by the following equation (1):

$$J = \sum_{i=L}^{Np} [y(k+i) - y^*(k+i)]^2 + \lambda \sum_{i=1}^{Nu} \Delta u(k+i-1)^2 \quad (1)$$

Here, $\|x\|$ shows a norm of the vector x.

A model predictive apparatus using the GPC system is shown in official gazettes such as Japanese patent application laid-open No. 4-118703 and No. 4-256102.

Generally, a control apparatus of a large scale plant such as a petrochemistry plant, steel plant and electric power plant, is controlled by a decentralized control system (hereafter, abbreviated in DCS) which is usually constructed by a plurality of proportion (P), integral (I) and differential (D) controller. When the plant is connected to the model predictive control apparatus, the model predictive control apparatus as an upper system is connected to the DCS as a lower system by a transmission line such as a data bus and a local area network (LAN) so as to control by transmitting a manipulation variable which is predictively calculated, from the model predictive control apparatus to the DCS. The followings are reasons:

i) First, since a calculation load is large and a control cycle can not shorten because the model predictive control apparatus repeats a predictive calculation and an optimizing calculation at every control cycle, it is convenient to allot a control having a fast time constant such as a fluid amount control in a process control to the DCS capable of shorten a control cycle because a load is light; and ii) Second, since the model predictive control apparatus treats a plurality of a manipulation variable and process variable, there is much probability of a stop of function caused by a trouble in a part of sensors. Accordingly, if there is a lower system such as the DCS, when the upper model predictive control apparatus stops, a stability of the plant is kept to secure a practical use of the plant.

On the other hand, the DCS generally has three control modes, namely, a manual (M) mode, automatic (A) mode and a cascade (C) mode. The M mode shows a case that a loop of the DCS is an open loop, the A mode shows a case that the loop of the DCS has a constant set point value or the loop is a closed loop, and the C mode shows a case that loop of the DCS has a variable set point value in the closed loop.

As described above, in the conventional hierarchical model predictive control system for performing by using the upper model predictive control apparatus and the lower DCS, the model predictive control apparatus performs a model prediction by using a manipulation variable signal of the apparatus as a set point value signal for the DCS without consideration of the control mode of the DCS. Therefore, in the case that the upper model predictive control apparatus operates the set point value of the loop, or that the operator intentionally changes the set point value of the DCS in the A mode in spite of the closed loop condition of the DCS, a influence thereof is not considered in the predictive calculation in the upper model predictive control apparatus, thereby resulting a problem that the manipulation variable is improper, which is obtained by the predictive calculation by the model predictive control apparatus.

SUMMARY OF THE INVENTION

In view of the above-mentioned condition, an object of the present invention is to provide a hierarchical model predictive control system capable of performing a precise control by exactly predicting a manipulation variable in spite of a control mode of the lower control system.

In order to achieve the above object, a hierarchical model predictive control system according to the present invention comprises a decentralized control system having a plurality of proportion, integral and differential (PID) control means for obtaining a manipulation variable having a plurality of control modes and controlling a process variable of a controlled object by a PID calculation, and for controlling the controlled object on the basis of an obtained manipulation variable; and model predictive control means for predicting a process variable prospective value of the controlled object by reading a control mode and control data of each PID control means by a predetermined control cycle and using a dynamic characteristic model of the controlled object on the basis of the control mode and the control data by reading, for successively calculating the manipulation variable with respect to each of the PID control means in the manner that there is a minimum performance function about a deviation and a manipulation variable between the process variable prospective value previously predicted and a predetermined process variable reference value, and for transmitting the calculated manipulation variable to the corresponding PID control means as a set point value corresponding to the control mode; wherein the PID control means performs an PID calculation on the basis of the set point value from the model predictive control means or set by an operator corresponding to the control mode.

As constituted in the above construction, the hierarchical model predictive control system according to the present invention, can exactly predict the process variable to the model predictive control system and in which a corresponding signal is used in the predictive calculation from the set point value, manipulation variable and process variable of the PID loop corresponding to the control mode of the PID control means. By this, it is possible to precisely control the plant by exactly predicting the process variable in spite of the control mode of each of the PID control means.

As described above, the present invention can precisely control by predicting the exact manipulation variable in spite of the control mode in the lower control system.

DETAILED DESCRIPTION OF THE PREFERRED EMBODIMENTS

There will be described in detail a hierarchical model predictive control system (hereafter also simply called as a predictive control system) according to preferred embodiments of the present invention in reference with the attached drawings.

Figure 1:
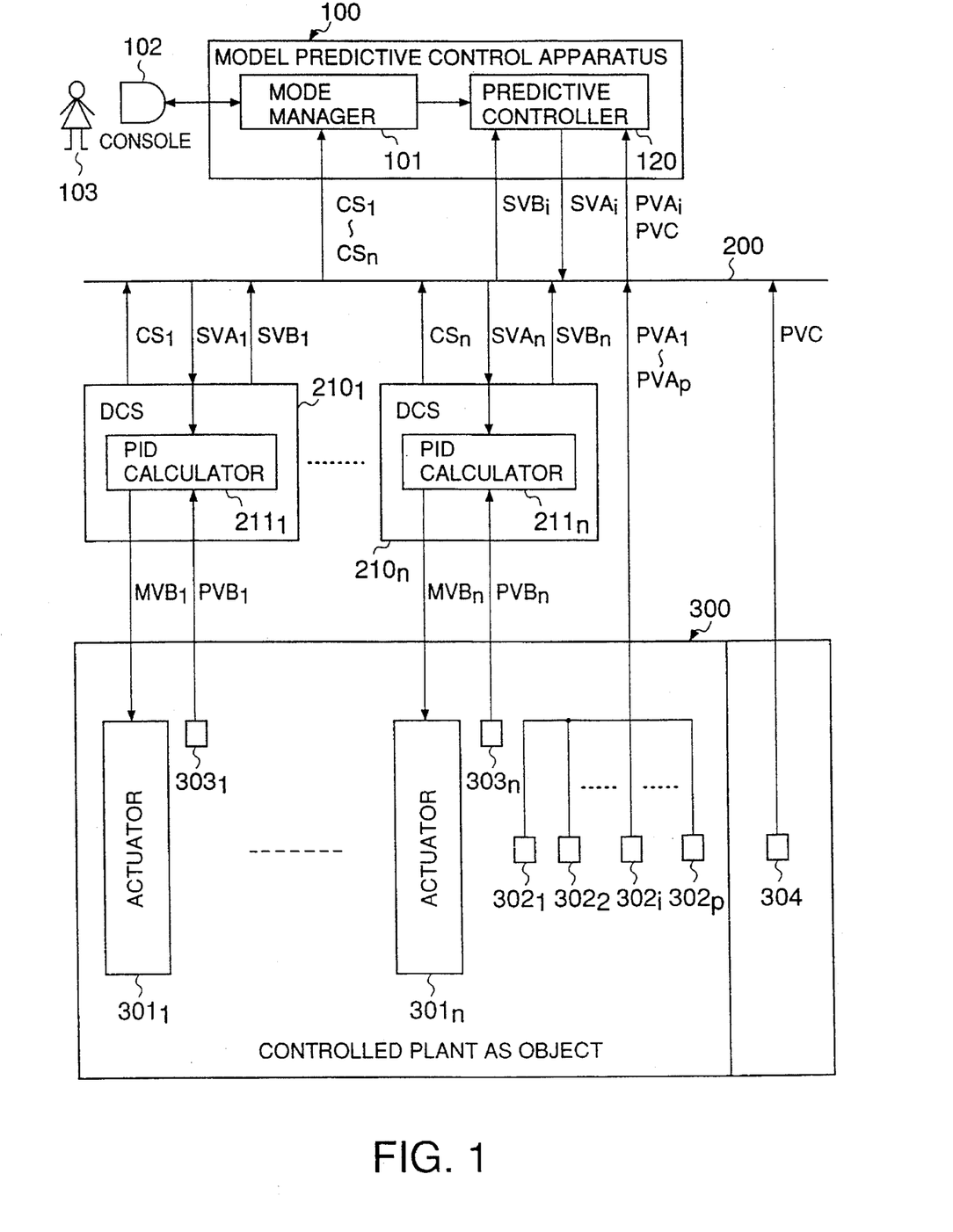
FIG. 1 is a block diagram showing a constitution of a predictive control system according to a first embodiment of the present invention.

FIG. 1 shows a predictive control system according to a first embodiment of the present invention. The predictive system of the first embodiment comprises a model predictive control apparatus 100, and a plurality of decentralized control systems (hereafter simply called as DCS) $210_1$–$210_n$. The model predictive control apparatus 100 includes a mode manager 101 connected to a console 102, and a predictive controller 120. Each DCS $210_i$ (i=1, ..., n) has a PID calculator $211_i$ for performing a PID calculation and which is connected to the model predictive control apparatus 120 through a local area network (LAN) 200 specified as a manufacturing automation protcol (MAP), for example. The DCS $210_i$ observes a signal $PVB_i$ as a process variable from a sensor $303_i$ of a controlled plant 300 as an object, obtains a manipulation variable $MVB_i$ by a PID calculation on the basis of the process variable $PVB_i$ and a set point value $SVA_i$, and issues the $MVB_i$ to the corresponding actuator $301_i$, thereby controlling the plant 300 as an object through the actuator $301_i$. The set point value $SVA_i$ will be described later, which is a value outputted from the model predictive control apparatus 100 or inputted by an operator. As described in the prior art, each DCS $210_i$ has itself three modes as the same as the prior art, namely, an M mode of the open loop condition, an A mode of closed loop condition in which the set point value $BVA_i$ is constant or the set point value $SVA_i$ is manually set, and a C mode of the closed loop in which the present condition is variable, thereby outputting a control mode signal $CS_i$ showing as to what the present condition is, to the mode manager 101 in the upper model predictive control apparatus 100. Sensors $302_1$–$302_p$ provided in the controlled plant 300 as an object detect process variable $PVA_1$–$PVA_p$ which are controlled by the model predictive control apparatus 100, and a sensor 304 detects another observation amount (hereafter called as a disturbance variable PVC) which has strong correlation with the process variable $PVA_1$–$PVA_p$ and can not be operated.

On the other hand, the model predictive control apparatus 100 reads an actual set point value $SVA_i$ by a predetermined control cycle, predictively calculates an optimum manipulation variable $SVA_i$ by using a predetermined predictive model on the basis of the actual set point value $SVB_i$ or the disturbance variable PVC, the process variables $PVA_1$–$PVA_p$, and the control mode signal $CS_i$ from respective DCS $210_i$ by using a predetermined predictive model, and transmits the calculated optimum manipulation variable $SVA_i$ to respective DCS $210_i$ as a set point value. Furthermore, the model predictive control apparatus 100 has three kinds of modes, namely, a mode in which respective manipulation variable (an actual set point value) $SVB_i$ is not used for the predictive calculation (a manual mode or M mode), a mode in which the manipulation variable $SVB_i$ is used in the predictive calculation only for a control response (a predictive mode or P mode), and a mode in which the manipulation variable $SVB_i$ is used for the control calculation (a control mode or A mode).

The mode manager 101 in the model predictive control apparatus 100 sets a mode of the model predictive control apparatus 100 corresponding to the control mode signal $CS_i$ which is transmitted from each DCS $210_i$ (i=1, ..., n) in accordance with the following ways:

(1) When a predetermined loop of DCS such as DCS $201_j$ is the M mode, an actual set point value $SVB_j$ of the DCS $201_j$ is set to the M mode in order not to use in the control calculation or the predictive calculation;

(2) When the predetermined DCS $201_j$ is the A mode, the actual set point value $SVB_j$ of the DCS $201_j$ is set to the P mode in order to use in only the predictive calculation of the control response; and (3) When the predetermined DCS $201_j$ is the C mode, the actual set point value $SVB_j$ of the DCS $201_j$ is used to the predictive calculation of the control response, and the optimum manipulation variable $SVA_i$ which has been calculated is set to the A mode as a set point value of the DCS $201_i$. Accordingly, the set point value is set in each DCS $201_i$.

Figure 2:
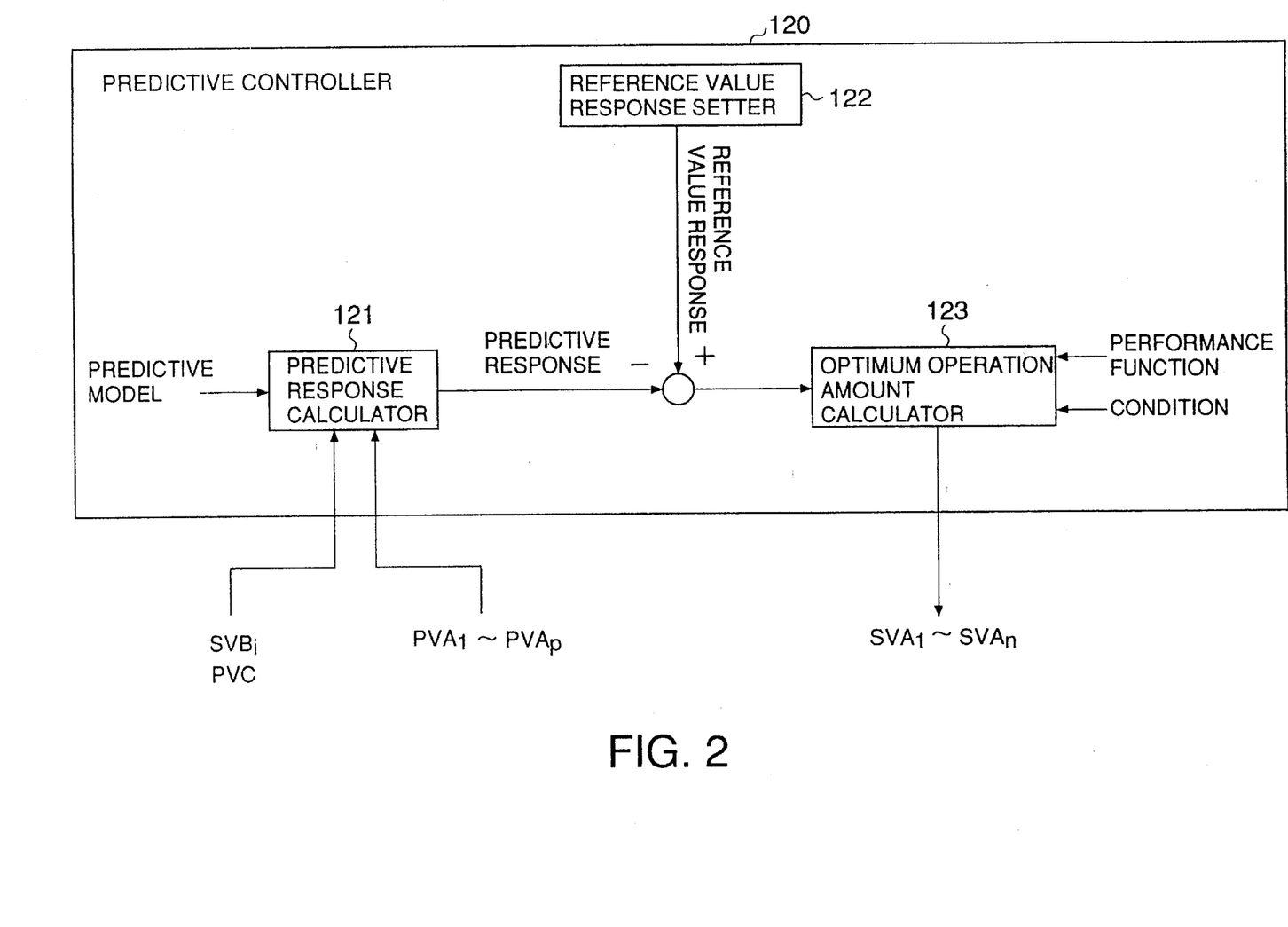
FIG. 2 is a block diagram showing a constitution of a predictive controller of the system shown in FIG. 1.

Next, there is described a predictive controller 120 of the model predictive control apparatus 100. FIG. 2 shows a concrete example of a configuration of the predictive controller 120. The predictive controller 120 comprises a predictive response calculator 121, a reference value response setter 122, and an optimum manipulation variable calculator 123. The predictive response calculator 121 calculates a process or controlled variable predictive response by using a predetermined predictive model on the basis of a mode set by the mode manager 101, the actual set point value $SVB_i$ in each DCS $210_i$, the disturbance variable PVC, and the present process variable $PVA_i$–$PVA_p$ detected by the sensors $302_i$–$302_p$. The response is concretely obtained by the followings. A future process variable predictive response $y_i(k+j)$ ($i=1, \ldots, p/j=1, \ldots, N_p$) is obtained under the condition that the actual set point values $SVA_1$—$SVA_p$ of the DCS $210_i$–$210_n$ and disturbance variable PVC are an input signal $U_i(k)$ ($i=1, \ldots, q$) (in this case $q=n+1$), and the process variable $PVA_i$–$PVA_p$ in the model predictive control system are an output signal $y_i(k)$ ($i=1, \ldots, p$) in accordance with an equation (2) as follows:

$$\begin{pmatrix} y_i(k) \\ \cdot \\ \cdot \\ \cdot \\ y_p(k) \end{pmatrix} = \begin{pmatrix} G_{i1}(z^{-1}) \ldots G_{iq}(z^{-1}) \\ \cdot \\ \cdot \\ \cdot \\ G_{p1}(z^{-1}) \ldots G_{pg}(z^{-1}) \end{pmatrix} \begin{pmatrix} u_i(k) \\ \cdot \\ \cdot \\ \cdot \\ u_p(k) \end{pmatrix} \quad (2)$$

where, $$G_{ij}(z^{-1}) = \frac{B_{ij}(z^{-1})}{A_{ij}(z^{-1})} z^{-L_{ij}}$$

$$A_{ij}(z^{-1}) = a_0^{ij} + a_1^{ij} z^{-1} + \ldots + a_n^{ij} z^{-n}$$

$$B_{ij}(z^{-1}) = b_1^{ij} z^{-1} + \ldots + b_n^{ij} z^{-n}$$

where a Z is an operator of Z-transformation, an $L_{ij}$ is a dead time, an $A_k^{ij}$ and $b_m^{ij}$ are constants determined by a $G_{ij}$.

When an input $u_1(k)$ within the inputs $u_1(k), \ldots, u_q(k)$ is the M mode, a predictive calculation is performed in the manner of the elimination for an influence of the input $u_1(k)$. For example, a predictive response of the process variable is obtained under the condition of $u_1(k)=0$, or the predictive response is obtained under the condition of $G_{i1}=0$ ($i=1, \ldots, p$).

On the other hand, the reference value response setter 122 is used for setting a desired reference value response $y^*_i(k+j)$ ($i=1, \ldots, p/j=1, \ldots, N_p$). Namely, reference value responses are set from the present time to the time after $N_p$ steps.

Furthermore, the optimum manipulation variable calculator 123 calculates an optimum manipulation variable under the condition of the set function from the process variable predictive response $y_i(k+j)$ and the reference value response $y^*_i(k+j)$. A calculation is performed below. Here, a performance function J is obtained by the following equation (3) without any constrained condition:

$$J = \sum_{j=L}^{Np} (y(k+j) - y^*(k+j))^2 + \quad (3)$$

$$\lambda \sum_{j=1}^{Nn} \Delta u(k+j-1)^2$$

where, $$y(k+j) = [y_i(k+j), \ldots, y_p(k+j)]^T$$
$$y^*(k+j) = [y^*_i(k+j), \ldots, y^*_p(k+j)]^T$$
$$\Delta u(k+j) = [\Delta u_i(k+j), \ldots, \Delta u_q(k+j)]^T$$
$$\Delta u_i(k+j) = u_i(k+j) - u_i(k+j-1)$$

A symbol $\lambda$ in the equation (3) denotes a weighting factor. When a step response from $u_j(k)$ to $y_i(k)$ is assumed as $h_{ij}(k)$, a step response matrix H(k) ($k=1, \ldots, N_p$) of the controlled plant 300 as the object can be represented by the following equation (4):

$$H(k) = \begin{pmatrix} h_{i1}(k) \ldots & h_{iq}(k) \\ \cdot & \cdot \\ \cdot & \cdot \\ \cdot & \cdot \\ h_{p1}(k) \ldots & h_{pq}(k) \end{pmatrix} \quad (4)$$

When a matrix G which includes as a component the step response matrix H(k) and can be represented by the following equation (5):

$$G = \begin{pmatrix} H(1) & 0 & & 0 \\ H(2) & H(1) & \ldots & 0 \\ H(3) & H(2) & \ldots & 0 \\ \cdot & \cdot & & \cdot \\ \cdot & \cdot & & \cdot \\ \cdot & \cdot & & \cdot \\ H(N_p) & H(N_p-1) & \ldots & H(N_p-N_u+1) \end{pmatrix} \quad (5)$$

is used, an increased vector $\Delta u$ can be obtained by the equation (6):

$$\Delta u = (G^T \cdot G + \lambda I)^{-1} \cdot G^T (y^* - y) \ldots \quad (6)$$

where, $$\Delta u = [\Delta u(k+1)^T, \ldots, \Delta u(k+N_u)^T]^T$$
$$y = [y(k+1)^T, \ldots, y(k+N_p)^T]^T$$
$$y^* = [y^*(k+1)^T, \ldots, y^*(k+N_p)^T]^T,$$

and a symbol I is a unit matrix. An optimum manipulation variable $u_i(k)$ is obtained by the following equation (7) when each manipulation variable increased component $\Delta u_i(k)$ ($i=1, \ldots, q$) is taken out from the increased vector $\Delta u$ which is obtained by using the above equation (6):

$$u_i(k) = u_i(k-1) + \Delta u_i(k) \ldots \quad (7)$$

The optimum manipulation variable $u_i(k)$ is outputted as a manipulation variable from the mode predictive control apparatus to supply as a set point value $SVA_i$ to the DCS $210_i$.

When the restricted condition is provided, the optimum manipulation variable $u_i(k+j)$ can be obtained by using methods disclosed in Japanese patent application laid-open No. 4-118703 and No. 4-256102 which have been already described.

Accordingly, when the DCS $210_i$ is in the M mode, since the optimum manipulation variable $u_i(k+j)$ corresponding to the DCS $210_i$ is not calculated in the predictive controller 120, the DCS $210_i$ can not obtain the set point value $SVA_i$. When the DCS $210_i$ is in the A mode, even though the optimum manipulation variable $u_i(k+j)$ corresponding to the DCS $210_i$ is calculated in the predictive controller 120, the calculated value is not supplied to the DCS $210_i$ as a set point value $SVA_i$. Furthermore, when the DCS $210_i$ is in the C mode, the optimum manipulation variable $u_i(k+j)$ corresponding to the DCS $210_i$ is predictively calculated in the predictive controller 120, thereby supplying as a set point value $SVA_i$ a calculated value to the DCS $210_i$.

Since the actual set point value in each DCS $210_i$ is used for the predictive calculation of the optimum manipulation variable, when the manipulation variable $SVA_i$ is modified or changed by the calculation of the upper and lower limiter after the DCS $210_i$ receives the manipulation variable $SVA_i$ outputted from the model predictive control apparatus 100 for example, it is possible to prevent a discrepancy between the manipulation variable $SVA_i$ on the side of the model predictive control apparatus 100 and the manipulation variable $SVA_i$ on the side of the DCS $210_i$.

As described above, since the control system according to the first embodiment can obtain the optimum manipulation variable responding to the control mode of each DCS $210_i$ and the predictive calculation of the optimum manipulation variable is performed on the basis of the actual set point value of each DCS $210_i$, it is possible to precisely control by exactly predicting the manipulation variable regardless of the control mode of each DCS $210_i$.

Even though the control system of the first embodiment automatically sets three mode of the model predictive control apparatus 100 corresponding to the mode control signal $CS_i$ from each DCS $210_i$ by using the mode controller 101, a new switch which can be selected by the operator 103 may be provided for setting the mode by the operator 103. By this constitution, it is possible to connect or cut down respective manipulation variable in the model predictive control system which is multi-input and multi-output control system, thereby freely changing the construction of the control system itself during operation of the control system. By this, it is possible to search a constitution of the most optimum control system in the manner of trial and error.

Furthermore, in the above first embodiment, since the predictive mode (P mode) is provided for the model predictive control apparatus 100 and the disturbance variable PVC is used for the process variable predictive calculation, it is possible to adopt a variable capable of observing as a disturbance of the controlled plant 300 as an object such as the state amount of the adjacent plant into the predictive calculation, thereby obtaining an effect as the same as that of the feedforward control of the disturbance signals, so the it is possible to improve the control performance against the disturbance.

Even though the first embodiment is described to have the disturbance variable being one, a plurality of the disturbance variables may be provided or there is no disturbance variable.

Figure 3:
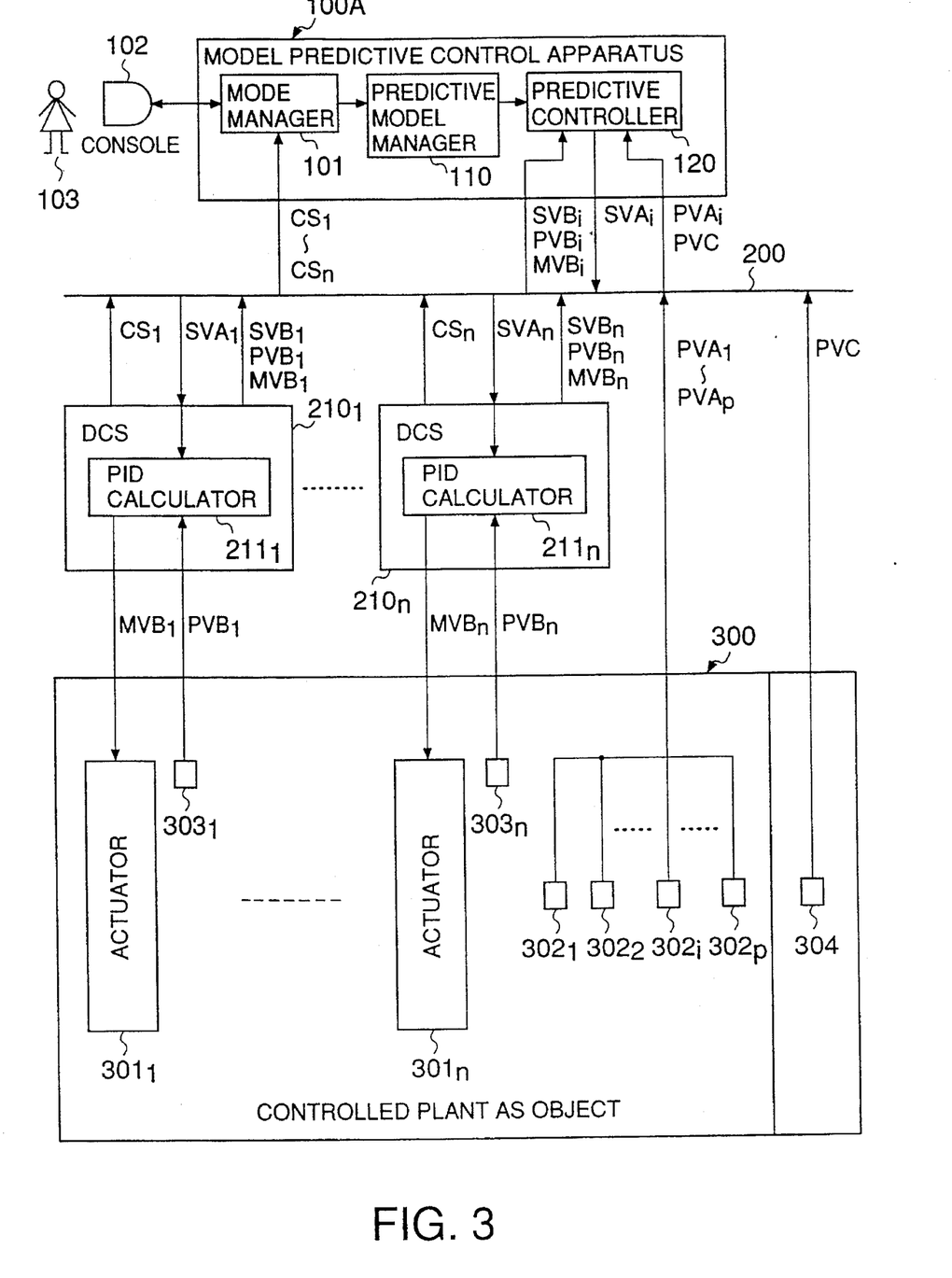
FIG. 3 is a block diagram showing a constitution of a predictive control system according to a second embodiment of the present invention.
Figure 4:
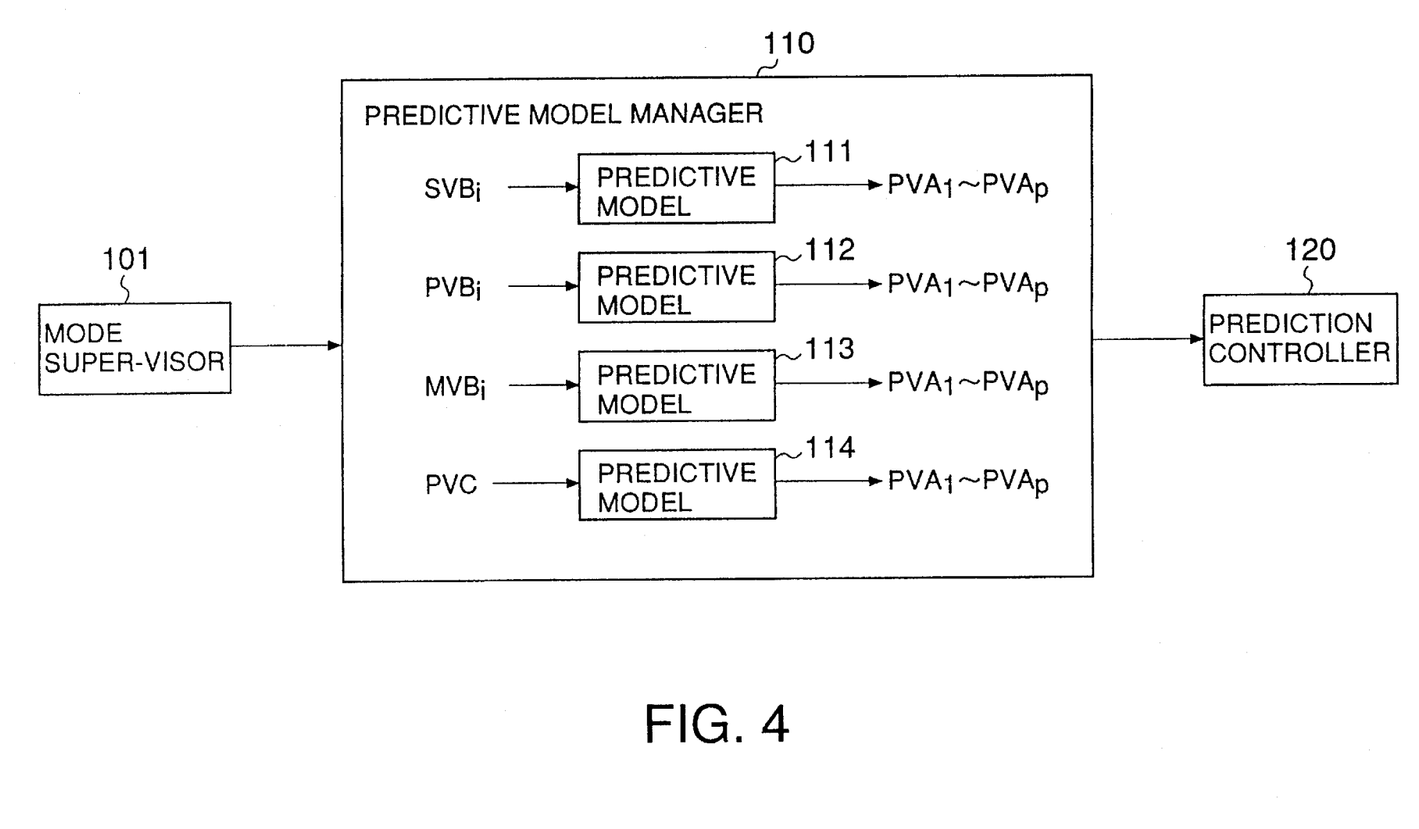
FIG. 4 is a block diagram showing a constitution of a predictive model supervisor of the system according to the second embodiment.

Next, FIG. 3 shows a constitution of a predictive control system according to a second embodiment. The predictive control system according to the second embodiment comprises a model predictive control system 100A in the place of the model predictive control system 100 in the predictive control system according to the first embodiment shown in FIG. 1. The model predictive control system 100A comprises a predictive model manager 110 between the mode manager 101 and the predictive controller 102 having the same construction of those of the model predictive system 100 shown in FIG. 1. The predictive model manager 110 has a plurality of predictive models 111, 112, 113 and 114 as a data base, as shown in FIG. 4, selects any of the plurality of predictive models corresponding to each mode which is set by the mode manager 101 or operator 103, and transmits a selected predictive model to the predictive response calculator 121 of the predictive controller 120. The predictive model 111 is a model to predict process variables $PVA_1$–$PVA_p$ of the controlled plant 300 as an object on the basis of the actual set point value $SVB_i$ of each DCS $210_i$, the predictive model 113 is a model to predict the process variables $PVA_1$–$PVA_p$ on the basis of the manipulation variable $MVB_i$ of each DCS $210_i$, and the predictive model 114 is a model to predict the controlled amounts $PVA_1$–$PVA_p$ on the basis of the disturbance variable PVC. When a control mode of the specified DCS $210_i$ is A or C in the case that a mode corresponding to the model predictive control apparatus 100A is P or A mode, the predictive model 111 is selected. When a control mode of the specified DCS $210_i$ is M mode in the case that a mode corresponding to the model predictive control apparatus 100A is M mode, the predictive model 112 or 113 is selected. A selection of the predictive model 112 or 113 is previously determined by the operator 103.

Accordingly, a class of $(G_{1i}(z^{-1}), G_{2i}(z^{-1}), \ldots, G_{pi}(z^{-1}))$ comprising components of i-th column of the matrix shown in the equation (2) is set in the predictive response calculator 121 of the predictive controller 120 of this embodiment. The class is one predictive model for each of the input signal $u_i(k)$ (i=1, ..., q) shown in the equation (2). The predictive calculator 121 calculates a predictive response by using The predictive model set in the above manner. The calculation of the predictive response is different from the first embodiment, the namely, the predictive controller 120 is sampling not only the actual set point value $SVB_i$ and disturbance variable PVC of each DCS $210_i$, but also the process variable $PVB_i$ and manipulation variable $MVB_i$ of the DCS $210_i$ at each predetermined control cycle.

In the second embodiment which is different from the first embodiment, even though the predetermined input signal $u_i(k)$ is in the M mode, the predictive calculation having the optimum manipulation variable is performed with respect to the input signal $u_i(k)$. However, in this case, the calculated optimum manipulation variable is not transmitted to the DCS $210_i$.

A calculation of the optimum predictive manipulation variable is performed by the same method described in the first embodiment.

As described above, it is needless to say that the predictive control system according to the second embodiment has the same effect as the first embodiment.

Figure 5:
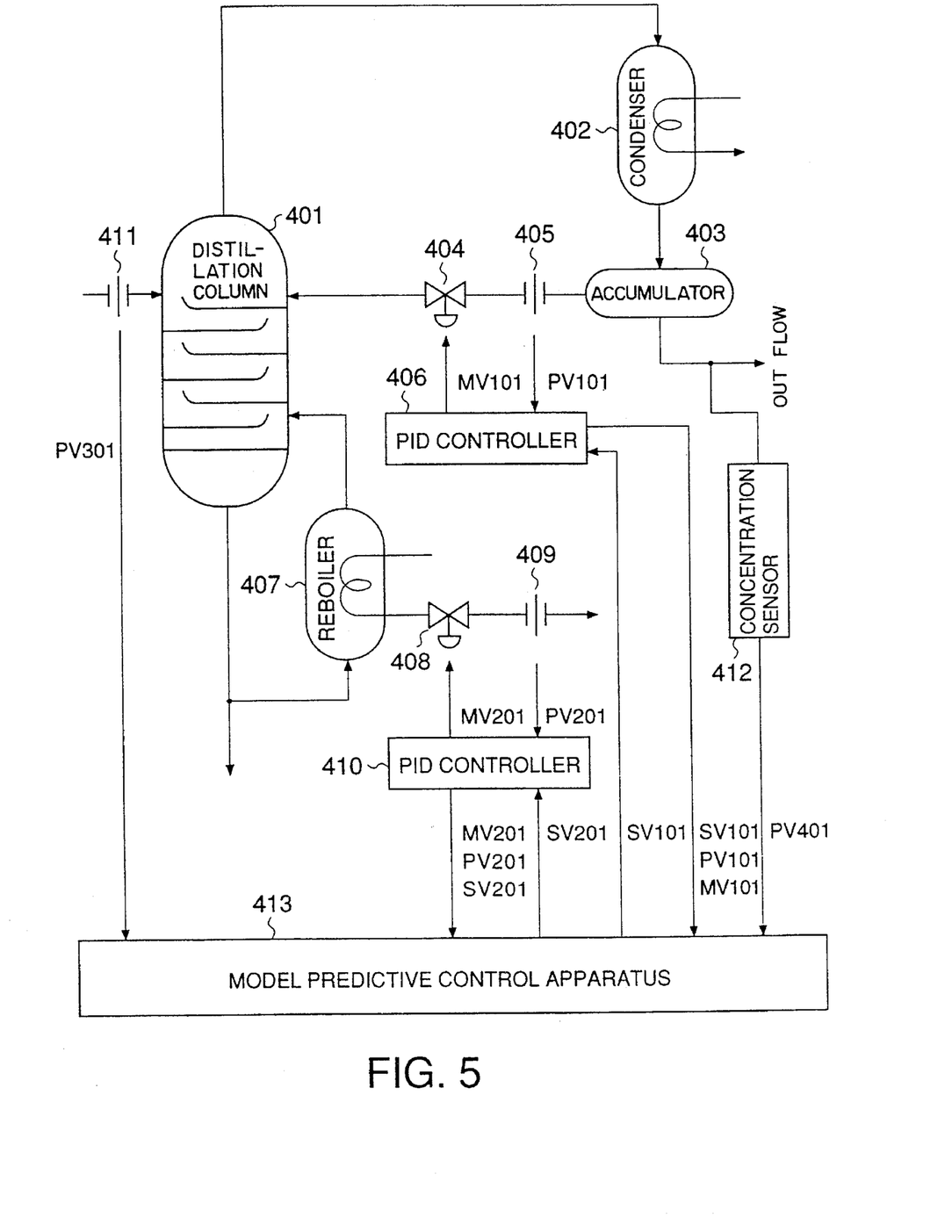
FIG. 5 is a block diagram showing a constitution in the case that the present invention applies to a distillation column process in a petrochemistry plant.

Next, there is described a case that the predictive control system of the present invention applies to a distillation column (column still) system in a petrochemistry plant with reference to FIG. 5. In FIG. 5, a distillation column 401 distills raw materials supplied through a feeder in a column so as to extract a component having high volatile characteristics from a top thereof and to extract a component having low volatile characteristics from a bottom thereof. The distillation is performed by a reflux function and a reheating function. The reflux function is performed in the manner that the column top component is cooled by a coolant to liquefy so as to return to the distillation column through an accumulator 403, and the reheating function is performed in the manner that the column bottom component is heated by a reboiler 407 provided at the bottom of the column and by using a heating medium so as to evaporate the bottom component. The lower DCS comprises a PID controller 406 for controlling the reflux amount, and a PID controller for controlling a heating amount by the reboiler by regulating a flowing amount of the heating medium of the reboiler.

When each signal in FIG. 5 corresponds to a signal shown in FIG. 1, an opening degree MV101 of a valve 404 corresponds to a manipulation variable MVB, a signal PV101 of the a flow sensor 405 corresponds to the process variable PVB, and a set point value SV101 corresponds to the set point value instruction SVA of the model predictive control apparatus 413 or the set point value SVB which is read again from the apparatus 413, in the PID controller 406.

In the same manner in the PID controller 410, an opening degree MV201 of a valve 408 corresponds to a manipulation variable MVB, a signal PV201 of a flow sensor 409 corresponds to the process variable PVB, and a set point value SV201 corresponds to the set point value instruction SVA of the model predictive control apparatus 413 or the set point value SVB which is read again from the apparatus 413.

Furthermore, an observation signal PV301 of a feeder flow amount sensor 411 corresponds to the disturbance variable PVC so as to supply to the model predictive control apparatus 413.

In the same manner, an observation signal PV401 of a concentration sensor 412 for measuring an impurity of an extracted product corresponds to a process variable PVA in the model predictive control system so as to output to the model predictive control apparatus 413.

The model predictive control apparatus 413 calculates a predictive response of the observation signal PV401 with respect to the concentration of the extracted product by using SV101, PV101 or MV101 of the PID controller 406, SV201, PV201 or MV201 and feeder flow amount PV301 of the PID controller 410, and the extracted product concentration PV401, and outputs the set point value SV101 of the reflux amount to the PID controller 406, and the set point value SV201 of the heating medium amount of the reboiler to the PID controller 410 by using the predictive response as a manipulation variable for an optimum control.

Therefore, it is possible to precisely control a distillation process.

What is claimed is:

1. A hierarchical type model predictive control system having a plurality of control means hierarchically provided for controlling a control object by a calculation of a proportion (P), integration (I) and differential or derivative (D), comprising:

a decentralized control system having a plurality of PID control means each having a plurality of control modes for obtaining by a PID calculation a manipulation variable for controlling a process variable of the control object, and for controlling the control object on the basis of an obtained manipulation variable; and model predictive control means for reading each of a control mode and control information of said plurality of PID control means at a predetermined control cycle, for predicting a process variable future value of said control object by using a dynamic characteristic model of said control object on the basis of said control mode and control information read from said PID control means, for sequentially calculating said manipulation variable about each of said PID control means to cause a deviation and a performance function of said manipulation variable to be at a minimum value in which said deviation has a value between a predicted process variable future value and a preestablished process variable reference value, and for transmitting the calculated manipulation variable as a set point value corresponding to said control mode to the corresponding PID control means;

wherein said PID control means is characterized in performing a PID calculation corresponding to said control mode on the basis of a set point value supplied from said model predictive control means or a set point value set by an operator.

2. The hierarchical model predictive control system according to claim 1, wherein said model predictive control means, with respect to an individual manipulation variable, has an M mode, a P mode, and an A mode; and further comprising:

mode managing means for setting a manipulation variable of said model predictive control means corresponding to a set point value of said PID control means to said M mode when a mode of a specified control means in said decentralized control system is an open loop condition, for setting said manipulation variable corresponding to said PID control means to said P mode when the mode of the specified PID control means of said decentralized control system is a closed loop condition having a constant set point value, and for setting said manipulation variable corresponding to said PID control means to said A mode when the mode of the PID control means in said decentralized control system is a closed loop condition having a variable set point value.

3. The hierarchical model predictive control system according to claim 1, wherein said model predictive control means comprises a plurality of dynamic characteristic models, and selection means for selecting a dynamic characteristic model of said plurality of dynamic characteristic models corresponding to a control mode of said PID control means, and predictively calculates a control future value of said PID control means by using a selected dynamic characteristic model.

4. The hierarchical model predictive control system according to claim 1, wherein said model predictive control means comprises:

a mode manager for receiving a control mode signal supplied from a specified one of said plurality of PID control means and for setting a mode of said model predictive control means as follows:

i) when said control mode signal specifies a manual mode for which an optimum manipulation variable is not calculated, said mode manager sets said model predictive control means to the manual mode in which an operation amount from said specified one of PID control means is not used;

ii) when said control mode signal specifies an automatic mode to use an operation amount of individual PID control means, said mode manager sets said model predictive control means to a predictive mode in which said operation amount from said specified one of PID control means is used only in a predictive calculation of a control response; and iii) when said control mode signal specifies a cascade mode showing a loop to be a closed loop in which a set value is variable, said mode manager uses said operation amount from said PID control means in a predictive calculation of a control response and sets said model predictive control means to an automatic mode in which an optimum operation amount by said predictive calculation is used as a set value of said PID control means; and a predictive controller for outputting a set value to said individual PID control means after processing a predictive calculation of said operation amount and said control amount which are outputted from said PID control means according to said mode which is set by said mode manager.

5. The hierarchical model predictive control system according to claim 4, wherein said predictive controller comprises:

a predictive response calculator for outputting a control amount predictive response corresponding to a predetermined predictive model on the basis of an actual operation amount set value from said individual PID control means, a present control amount detected by sensors, and a disturbance variable, in accordance with said mode which is set by said mode manager;

a reference value response setter for setting a desired reference value response from the present time to a predetermined latter step;

a subtracter for outputting a subtracted response after subtracting said predictive response from said reference value response; and an optimum operation amount calculator for calculating an optimum operation amount by calculating said calculated response for the predictive response from said reference value response on the basis of a predetermined performance factor and a constrained condition.

6. The hierarchical model predictive control system according to claim 5, wherein said predictive response calculator obtains a future control amount predictive response $y_i(k+j)$ ($i=1, \ldots, p/j=1, \ldots, N_p$) under the condition that the actual set values $SVA_1 - SVA_p$ of the DCS $210_1 - 210_n$ and disturbance variable PVC are an input signal $U_i(k)$ ($i=1, \ldots, q$) (in this case $q=n+1$), and the control amount $PVA_1 - PVA_p$ in the model predictive control system are an output signal $y_i(k)$ ($i=1, \ldots, p$) in accordance with the following equation:

$$\begin{pmatrix} y_1(k) \\ \cdot \\ \cdot \\ \cdot \\ y_p(k) \end{pmatrix} = \begin{pmatrix} G_{i1}(z^{-1}) \ldots G_{iq}(z^{-1}) \\ \cdot \\ \cdot \\ \cdot \\ G_{p1}(z^{-1}) \ldots G_{pg}(z^{-1}) \end{pmatrix} \begin{pmatrix} u_1(k) \\ \cdot \\ \cdot \\ \cdot \\ u_p(k) \end{pmatrix}$$

where, $$G_{ij}(z^{-1}) = \frac{B_{ij}(z^{-1})}{A_{ij}(z^{-1})} z^{-L_{ij}}$$

$$A_{ij}(z^{-1}) = a_0^{ij} + a_1^{ij} z^{-1} + \ldots + a_n^{ij} z^{-n}$$

$$B_{ij}(z^{-1}) = b_1^{ij} z^{-1} + \ldots + b_n^{ij} z^{-n}$$

and where a Z is an operator of Z-transformation, an $L_{ij}$ is a dead time, an $A_k^{ij}$ and $b_m^{ij}$ are constants determined by a $G_{ij}$.

7. The hierarchical model predictive control system according to claim 6, wherein said optimum operation amount calculator calculates a performance function J on the basis of said optimum operation amount on the basis of said control amount predictive response $y_i(k+j)$ and said reference value response $y^*_i(k+j)$ by using the following equation:

$$J = \sum_{j=L}^{Np} (y(k+j) - y^*(k+j))^2 + \lambda \sum_{j=1}^{Nn} \Delta u(k+j-1)^2$$

where, $y(k+j) = [y_1(k+j), \ldots, y_p(k+j)]^T$
$y^*(k+j) = [y^*_1(k+j), \ldots, y^*_p(k+j)]^T$
$\Delta u(k+j) = [\Delta u_1(k+j), \ldots, \Delta u_q(k+j)]^T$
$\Delta u_i(k+j) = u_i(k+j) - u_i(k+j-1)$ and the symbol $\lambda$ in the equation denotes a weighting factor.

8. The hierarchical model predictive control system according to claim 1, wherein said model predictive control means comprises a predictive controller for outputting a set value to said individual PID control means after processing a predictive calculation of said operation amount and said control amount which are outputted from said PID control means according to a set mode which is inputted through a console by an operator.

9. The hierarchical model predictive control system according to claim 1, wherein said model predictive control means comprises a predictive model manager for selecting any predictive model of a plurality of predictive models corresponding to a set mode which is inputted through a console by an operator; and a predictive controller for outputting a set value to said individual PID control means after processing a predictive calculation of said operation amount and said control amount which are outputted from said PID control means according to said set mode which is supplied from said predictive model manager.

10. The hierarchical model predictive control system according to claim 1, wherein said decentralized control system and said model predictive control means are connected to a controlled plant as an object which comprises at least a plurality of actuators and a plurality of sensors each for outputting a sensor signal as said control amount through said individual PID control means in said decentralized control system; and wherein said individual PID control means outputs said desired control amount to each of said actuators corresponding to said individual PID control means on the basis of a set value from said model predictive control means.

11. The hierarchical model predictive control system according to claim 10, wherein said controlled plant further comprises various control amount detection means for detecting various and present control amounts to supply said model predictive control means, and disturbance variable output means for detecting disturbance variables and for supplying said disturbance variables to said model predictive control means.

12. The hierarchical model predictive control system according to claim 11, wherein
said controlled plant is a petrochemistry plant including a distillation column (a column still) process comprising a feeder having a first flow amount sensor which supplies a flow amount detection signal to said model predictive control means, a distillation column to which materials are supplied through said feeder, a condenser for liquidizing a component outputted from a top of said distillation column and having a low volatility by freezing, an accumulator for flowing back a liquidized component by said condenser to said distillation column, a reboiler for heating a bottom component of said distillation column to be evaporated, a second flow amount sensor and a first valve provided in a supply pipe for said liquidized materials from said accumulator to said distillation column, and a third flow amount sensor and a second valve provided in an extraction pipe for extracting a heating medium supplied to said reboilor;

wherein one of said PID control means receives as said sensor signal a detection signal of said second flow amount sensor, and outputs said desired operation amount to said first valve; and wherein another of said PID control means receives as said sensor signal a detection signal of third second flow amount sensor, and outputs said desired operation amount to said second valve.

13. The hierarchical model predictive control system according to claim 12, wherein said accumulator comprises a concentration sensor for detecting a concentration of products extracted from said distillation column and provided in an extraction pipe of said products; and said concentration sensor and said first flow amount sensor are provided for detect said various control amount to supply to said model predictive control means.

14. The hierarchical model predictive control system according to claim 1, wherein said model predictive control means comprises:
  a mode manager for receiving a control mode signal supplied from a specified one of said plurality of PID control means and for setting a mode of said model predictive control means as follows:
  i) when said control mode signal is in a manual mode for which an optimum manipulation variable is not calculated, said mode manager sets said model predictive control means to a manual mode in which said operation amount from said specified one of PID control means is not used;
  ii) when said control mode signal is in an automatic mode to use an operation amount of individual PID control means, said mode manager sets said model predictive control means to a predictive mode in which said operation amount from said specified one of PID control means is used only in a predictive calculation of a control response; and
  iii) when said control mode signal is in a cascade mode showing a loop to be a closed loop in which a set value is variable, said mode manager uses said operation amount from said PID control means in a predictive calculation of a control response and sets said model predictive control means to an automatic mode in which an optimum operation amount by said predictive calculation is used as a set value of said PID control means;

a predictive model manager for selecting a predictive model from a plurality of predictive models corresponding to said mode which is set by said mode manager so as to transmit a selected predictive model; and a predictive controller for outputting a set value to said individual PID control means after processing a predictive calculation of said operation amount and said control amount which are outputted from said PID control means according to said predictive model which is transmitted from said predictive model manager.

15. The hierarchical model predictive control system according to claim 14, wherein said predictive controller comprises a predictive response calculator for outputting a control amount predictive response corresponding to a predetermined predictive model on the basis of an actual operation amount set value from said individual PID control means, a present control amount detected by sensors, and a disturbance variable, in accordance with said mode which is set by said mode manager;

a reference value response setter for setting a desired reference value response from the present time to a predetermined latter step;

a subtracter for outputting a subtracted response after subtracting said predictive response from said reference value response; and an optimum operation amount calculator for calculating an optimum operation amount by calculating said calculated response for the predictive response from said reference value response on the basis of a predetermined performance factor and a constrained condition.

16. The hierarchical model predictive control system according to claim 15, wherein said predictive response calculator obtains a future control amount predictive response $y_i(k+j)$ ($i=1, \ldots, p/j=1, \ldots, N_p$) under the condition that the actual set values $SVA_1$–$SVA_p$ of the DCS $210_1$–$210_n$ and disturbance variable PVC are an input signal $U_i(k)$ ($i=1, \ldots, q$) (in this case q=n+1), and the control amount $PVA_1$–$PVA_p$ in the model predictive control system are an output signal $y_i(k)$ ($i=1, \ldots, p$) in accordance with the following equation:

$$\begin{pmatrix} y_1(k) \\ \cdot \\ \cdot \\ \cdot \\ y_p(k) \end{pmatrix} = \begin{pmatrix} G_{11}(z^{-1}) \ldots G_{1q}(z^{-1}) \\ \cdot \\ \cdot \\ \cdot \\ G_{p1}(z^{-1}) \ldots G_{pg}(z^{-1}) \end{pmatrix} \begin{pmatrix} u_1(k) \\ \cdot \\ \cdot \\ \cdot \\ u_p(k) \end{pmatrix}$$

where, $$G_{ij}(z^{-1}) = \frac{B_{ij}(z^{-1})}{A_{ij}(z^{-1})} z^{-L_{ij}}$$

$$A_{ij}(z^{-1}) = a_0^{ij} + a_1^{ij} z^{-1} + \ldots + a_n^{ij} z^{-n}$$

$$B_{ij}(z^{-1}) = b_1^{ij} z^{-1} + \ldots + b_n^{ij} z^{-n}$$

and where a Z is an operator of Z-transformation, an $L_{ij}$ is a dead time, an $A_k^{ij}$ and $b_m^{ij}$ are constants determined by a $G_{ij}$.

17. The hierarchical model predictive control system according to claim 16, wherein said optimum operation amount calculator calculates a performance function J on the basis of said optimum operation amount on the basis of said control amount predictive response $y_i(k+j)$ and said reference value response $y^*_i(k+j)$ by using the following equation:

$$J = \sum_{j=L}^{Np} (y(k+j) - y^*(k+j))^2 + \lambda \sum_{j=1}^{Nn} \Delta u(k+j-1)^2$$

where, $y(k+j) = [y_i(k+j), \ldots, y_p(k+j)]^T$
$y^*(k+j) = [y^*_i(k+j), \ldots, y^*_p(k+j)]^T$
$\Delta u(k+j) = [\Delta u_i(k+j), \ldots, \Delta u_q(k+j)]^T$
$\Delta u_i(k+j) = u_i(k+j) - u_i(k+j-1)$ where, $y(k+j) = [y_i(k+j), \ldots, y_p(k+j)]^T$ $y^*(k+j) = [y^*_i(k+j), \ldots, y^*_p(k+j)]^T$ $\Delta u(k+j) = [\Delta u_i(k+j), \ldots, \Delta u_q(k+j)]^T$ $\Delta u_i(k+j) = u_i(k+j) - u_i(k+j-1)$ and the symbol $\lambda$ in the equation denotes a weighting factor.

18. A hierarchical type model predictive control system having a plurality of control means hierarchically provided for controlling a control object by a calculation of a proportion (P), integration (I) and differential or derivative (D), comprising:

means for reading each of a control mode and control information from each of the plurality of control means at a predetermined control cycle; and means for predicting a process variable future value of said control object by using a dynamic characteristic model of said control object on the basis of said control mode and control information read from the plurality of control means.

* * * * *